United States Patent Office

3,280,081
Patented Oct. 18, 1966

3,280,081
INTERPOLYMERS OF ETHYLENICALLY
UNSATURATED SULFINES
Edward M. La Combe and Frederick E. Bailey, Jr.,
Charleston, W. Va., assignors to Union Carbide Corporation, a corporation of New York
No Drawing. Filed Nov. 29, 1963, Ser. No. 327,092
11 Claims. (Cl. 260—79.7)

The present application is a continuation-in-part of co-pending application Serial No. 130,482, filed August 10, 1961, and Serial Nos. 247,365 and 247,369, filed December 26, 1962, and now both abandoned, incorporated herein by reference.

The present invention is concerned with a novel and useful class of polymeric compositions, and is especially concerned with normally solid, substantially water soluble interpolymers of certain alpha-ethylenically unsaturated sulfines, i.e., sulfonium compounds possessing a terminal ethylenic unsaturation. Such interpolymers, it has been found, are eminently suited for use as flocculents for the disperse phase of aqueous anionic suspensions.

More particularly, the alpha-ethylenically unsaturated sulfines contemplated by this invention can be represented by the formula:

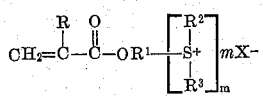

wherein R designates either a hydrogen atom or a methyl radical; $R^1$ designates a saturated aliphatic hydrocarbon radical containing from 1 to 4, and preferably from 2 to 3 carbon atoms, such radical more preferably being unsubstituted in the position adjacent to the oxygen atom to which it is directly connected; $R^2$ designates an alkyl radical containing from 1 to 4, and preferably from 1 to 2 carbon atoms; $R^3$ designates either a methyl or carboxymethyl (—CH$_2$COOH) radical; X designates a halogen atom, such as a bromine, iodine or chlorine atom, or a methyl sulfate (—OSO$_3$CH$_3$) radical, and specifically designates a chlorine atom when $R^3$ designates a carboxymethyl radical; and $m$ designates an integer of from 1 to 2. Moreover, in those instances when $m$ is 1, the sulfonium radical

is preferably attached to that carbon atom of the radical designated by $R^1$ which is farthest from the adjacent oxygen atom, i.e., the carbon atom in the 1-position. When $m$ is 2, the sulfonium radicals are preferably attached to vicinal carbon atoms of the radical designated by $R^1$, and more preferably to those vicinal carbon atoms of the radical which are farthest from the adjacent oxygen atom, i.e., the carbon atoms in the 1,2-position. In addition, when $m$ is 2, $R^1$ more preferably contains at least 3 carbon atoms.

As illustrative of such alpha-ethylenically unsaturated sulfines, which, in polymerized form, are a component of the interpolymers of this invention, there can be mentioned acryloxymethyldimethylsulfonium methylsulfate,
(2-acryloxyethyl)dimethylsulfonium methylsulfate,
(2-acryloxyethyl)dimethylsulfonium bromide,
(2-acryloxyethyl)dimethylsulfonium iodide,
(2-acryloxyethyl)methylethylsulfonium methylsulfate,
(2-acryloxyethyl)methylbutylsulfonium methylsulfate
(3-acryloxypropyl)dimethylsulfonium methylsulfate,
(4-acryloxybutyl)dimethylsulfonium methylsulfate,
(2-methacryloxyethyl)dimethylsulfonium methylsulfate,
(acryloxymethyl)carboxymethylmethylsulfonium
  chloride,
(2-acryloxyethyl)carboxymethylmethylsulfonium
  chloride,
(2-acryloxyethyl)carboxymethylethylsulfonium chloride,
(2-acryloxyethyl)carboxymethylbutylsulfonium chloride,
(3-acryloxypropyl)carboxymethylmethylsulfonium
  chloride,
(4-acryloxybutyl)carboxymethylmethylsulfonium
  chloride,
(2-methacryloxyethyl)carboxymethylmethylsulfonium
  chloride,
3-acryloxypropyl-1,2-bis(dimethylsulfonium)
  di(methylsulfate),
3-methacryloxypropyl-1,2-bis(dimethylsulfonium)
  di(methylsulfate),
4-acryloxybutyl-1,2-bis(dimethylsulfonium)
  di(methylsulfate),
4-methacryloxybutyl-1,2-bis(dimethylsulfonium)
  di(methylsulfate),
3-acryloxypropyl-1,2-bis(carboxymethylmethylsulfonium) dichloride,
4-methacryloxybutyl-1,2-bis(carboxymethylmethylsulfonium)dichloride, etc.

The preferred alpha-ethylenically unsaturated sulfine monomers are the compounds represented by the formula:

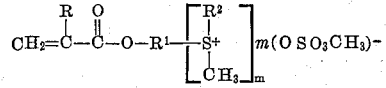

wherein R, $R^1$, $R^2$ and $m$ are as defined above.

The interpolymers of this invention include copolymers of an alpha-ethylenically unsaturated sulfine as defined above, with an alpha-ethylenically unsaturated comonomer selected from the group consisting of (a) acrylamide and lower alkyl substituted acrylamides, such as methacrylamide and N,N-dimethylacrylamide; (b) the vinylbenzenes, including styrene and lower alkyl substituted vinylbenzenes; (c) the N-vinylpyrrolidones, such as N-vinyl-2-pyrrolidone; and (d) the N-alkyl-N-vinylamides of the formula:

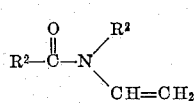

wherein each $R^2$ is independently selected as defined above, such as N-methyl-N-vinylacetamide, N-ethyl-N-vinylacetamide, N - butyl-N-vinylacetamide, N-methyl-N-vinylpropionamide, etc., and the like.

The amount of polymerized alpha-ethylenically unsaturated sulfine in the interpolymers of this invention must be sufficient to assure the substantial and preferably complete water solubility of the polymer, as well as to provide an effective flocculent. To this end, the interpolymers generally contain, in polymerized form and on a theoretical monomer basis, at least about 5 mole percent, preferably from about 5 to about 80 mole percent, and more preferably from about 10 to about 60 mole percent of the alpha-ethylenically unsaturated sulfine when copolymerized with either acrylamide or a vinylbenzene, or at least about 25 mole percent, preferably from about 25 to about 80 mole percent, and more preferably from about 40 to about 60 mole percent of the alpha-ethylenically unsaturated sulfine when copolymerized with either an N-vinylpyrrolidone or an N-alkyl-N-vinylamide. The minimal amount of polymerized alpha-ethylenically unsaturated sulfine required to assure water solubility may, of course, vary somewhat depending upon the particular comonomer polymerized therewith. On the other hand, it has been found that the interpolymerization of the alpha-ethylenically unsaturated sulfine with an alpha-ethylenically unsaturated comonomer as defined above provides a polymeric product which is, in general, more easily handled due to the granular form in which it is readily produced as compared with homopolymers of the alpha-ethylenically unsaturated sulfine. Moreover, such interpolymers can also ordinarily be obtained as higher molecular weight products having increased effectiveness as a flocculent. To this end, the interpolymers preferably contain, in polymerized form and on a theoretical monomer basis at least about 20 mole percent of the alpha-ethylenically unsaturated comonomer and up to about 80 mole percent of the alpha-ethylenically unsaturated sulfine. More preferred in this regard are the interpolymers containing, in polymerized form and on a theoretical monomer basis, from about 40 to about 90 mole percent of either acrylamide or a vinylbenzene, or from about 40 to 60 mole percent of either an N-vinylpyrrolidone or an N-alkyl-N-vinylamide.

In addition, the interpolymers of this invention include terpolymers of an alpha-ethylenically unsaturated sulfine with both an alpha-ethylenically unsaturated comonomer as defined above and with an alpha-ethylenically unsaturated thio-ether represented by the formula:

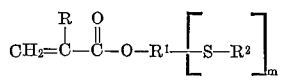

wherein R, R$^1$, R$^2$ and $m$ are as defined above. As illustrative of such alpha-ethylenically unsaturated thio-ethers, there can be mentioned:

methylthiomethyl acrylate,
2-methylthioethyl acrylate,
2-ethylthioethyl acrylate,
2-butylthioethyl acrylate,
2-methylthiopropyl acrylate,
4-methylthiobutyl acrylate,
2-methylthioethyl methacrylate,
2,3-bis(methylthio)propyl acrylate,
2,3-bis(methylthio)propyl methacrylate,
3,4-bis(methylthio)butyl acrylate,
3,4-bis(methylthio)butyl methacrylate, etc.

Such terpolymers contain, in polymerized form and on a theoretical monomer basis, (a) at least about 50 mole percent of the alpha-ethylenically unsaturated sulfine, when taken together with the amount of polymerized alpha-ethylenically unsaturated thio-ether present, and (b) from about 5 to about 80 mole percent, and preferably from 10 to about 60 mole percent of the alpha-ethylenically unsaturated sulfine when interpolymerized with either acrylamide or a vinylbenzene and from about 25 to about 80 mole percent, and preferably from 40 to 60 mole percent of the alpha-ethylenically unsaturated sulfine when interpolymerized with either an N-vinylpyrrolidone or an N-alkyl-N-vinylamide, based upon the total amount of polymerized monomers present. It is also to be noted that the polymerized alpha-ethylenically unsaturated sulfine component of the interpolymers of this invention can be composed of a mixture of sulfines, such that more than one type of sulfonium radical is present. Similarly, more than one type of comonomer can also be present, including those specifically described above, as well as a minor amount of other copolymerizable monomers.

The interpolymers of this invention can be produced by several different techniques. For instance, the alpha-ethylenically unsaturated sulfine can be obtained initially in monomeric form, and subsequently polymerized by conventional processes for the polymerization of alpha-ethylenically unsaturated compounds together with one or more alpha-ethylenically unsaturated comonomers as defined above, so as to produce interpolymers thereof. When desired initially in monomeric form, the sulfine can be obtained by reacting an alpha-ethylenically unsaturated thio-ether with an alkylating agent in accordance with the equation:

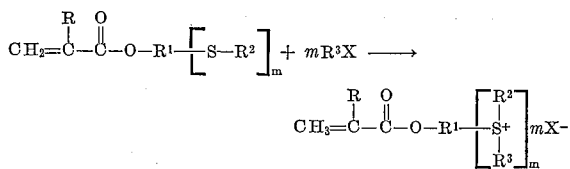

wherein R, R$^1$, R$^2$, R$^3$, X and $m$ are as defined above. Reactions between a thio-ether and an alkylating agent are in general discussed, for instance, by H. Gilman in "Organic Chemistry," vol. 1, 2nd ed., J. Wiley & Sons, N.Y. (1948), page 867, such teachings being incorporated herein by reference. Concordant therewith, by way of illustration, the alkylation can be carried out by bringing the thio-ether and the alkylating agent into reactive admixture, in a suitable solvent or diluent, if desired, at a temperature of from about 25° C. or slightly lower, up to about 90° C. to 100° C. or slightly higher. In addition, a small amount of a conventional polymerization inhibitor, such as hydroquinone, or the like, is preferably incorporated in the reaction mixture. As typical of the alkylating agents which can be employed in this regard, there can be mentioned dimethyl sulfate, methyl halides, such as methyl bromide, methyl iodide, and methyl chloride, chloroacetic acid, etc. Moreover, the reaction is preferably carried out in a diluent which is a solvent for the thio-ether, but a non-solvent for the resulting sulfine product, such as benzene, isopropyl ether, etc., Upon completion of the reaction, the sulfine product can be separated and recovered in any convenient manner.

The polymeric flocculents of this invention can thereafter be obtained by conventional polymerization processes. Thus, for instance, the alpha-ethylenically unsaturated sulfine can be polymerized in admixture with one or more alpha-ethylenically unsaturated comonomers in proportions as hereinabove described in connection with the polymer compositions, and in contact with a catalytic amount of a free-radical polymerization catalyst or initiator. Typical free-radical polymerization catalysts include, for instance, azo compounds, such as azo-1,1'-diisobutyronitrile, azo-2,2'-diisobutyronitrile, dimethyl azo-2,2'-diisobutyrate, azo-2,2'-bis(2,4-dimethylvaleronitrile), azo-2,2'-diisobutyramide, etc.; peroxides, such as hydrogen peroxide, sodium peroxide, peracetic acid, acetyl peroxide, benzoyl peroxide, potassium persulfate, calcium percarbonate, etc.; alkylborons such as tributylboron, etc., and the like. The catalyst is ordinarily incorporated in the polymerization reaction mixture in a concentration of from about 0.01 to about 5 percent or more by weight, and preferably from about 0.2 to about 2 percent by weight, based upon the weight of the monomers, although any catalytic amount thereof can be utilized.

Preferably, the polymerization is carried out in diluent which is a solvent for the monomers and in which the polymer product is more preferably insoluble. Particularly useful solvents which can be utilized in this connection are acetone and acetonitrile, although any other suitable inert organic solvent such as N,N-dimethylformamide, dimethylsulfane, N,N-dimethylacetamide, ethylene carbonate, ethylene carbamate, gamma-butyrolactone, N-methyl-2-pyrrolidone, etc., can also be employed. Alternatively, other conventional polymerization techniques, such as bulk, suspension, or emulsion polymerizations, etc., are also applicable. Similarly, other diluents, such as water, benzene, toluene, xylene, hexane, heptane, etc., can also be used.

Moreover, it has been found, particularly in connection with polymerization in which acrylamide is employed as a comonomer, that especially good results are obtained by carrying the polymerization using as the preferred diluent, either acetone, acetonitrile, an acetone-acetonitrile mixture containing either component in a proportion of from about 1 to about 99 percent by weight, or a constant boiling methyl acetate-methanol mixture, and by dissolving the monomers in such diluent in a concentration of from about 5 to about 50 percent and preferably from about 5 to about 30 percent by weight of total monomer based upon the total weight of the polymerization charge. When conducted in this manner, the resulting polymer is ordinarily obtained as an exceptionally high molecular weight, granular product which is conveniently handled, readily dissolved in water, and which is particularly effective as a flocculent as herein described. In contrast therewith, polymer products of like chemical constituency, produced, however, in water or dimethylformamide, were obtained in the form of a clear gel which is useful as a flocculent, but which was difficult to agglomerate and handle, while similar products, produced in benzene, heptane and ethylene dichloride were generally of lower molecular weight and less effective in subsequent use as a flocculent.

The polymerization is generally effected by bringing the monomer into contact with the catalyst at a temperature of from about −10° C. or slightly lower, to about 120° C. or slightly higher, accompanied by heating or cooling as needed to maintain the temperature at the desired level. The polymerization time will depend upon a variety of factors, such as the nature of the monomers, catalyst, and/or diluent employed, the reaction temperature, etc., and can vary over a wide range. For instance, a suitable reaction period lies in the range of from about 1 hour to about 200 hours, although any period sufficient to produce a polymeric product can be employed. In addition, the polymerization can be carried out under atmospheric, superatmospheric, or subatmospheric pressure, as desired.

Upon completion of the polymerization, the polymer product can be recovered in any convenient manner, such as by coagulation, filtration, centrifugation, etc. The reaction product can also be employed directly in many uses for the polymer, obviating the recovery of the polymer per se.

In an alternative manner to the polymerization technique described above, the alkylation of the alpha-ethylenically unsaturated thio-ether and the polymerization of the monomers can be carried out in one operation by incorporating the alkylating agent in a polymerization reaction mixture containing the thio-ether in admixture with an alpha-ethylenically unsaturated comonomer as defined above. In such a procedure, it is to be noted, the reactants should be employed in a ratio of at least about 0.5 mole, and preferably at least about 1 mole, up to about 5 or more moles of the alkylating agent per thio-ether radical, $[S-R^2]$, of the alpha-ethylenically unsaturated thio-ether. Moreover, the alpha-ethylenically unsaturated thio-ether should be employed in an amount sufficient to provide upon alkylation and polymerization, on a theoretical monomer basis, from about 5 to about 80 mole percent, and preferably from about 10 to about 60 mole percent of a polymerized alpha-ethylenically unsaturated sulfine when inter polymerized with either acrylamide or a vinylbenzene and from about 25 to about 80 mole percent, and preferably from about 40 to about 60 mole percent of a polymerized alpha-ethylenically unsaturated sulfine when interpolymerized with either an N-vinylpyrrolidone or an N-alkyl-N-vinylamide, based upon the total amount of polymerized monomers present. Such amount is readily determinable by one skilled in the art in light of this disclosure. The polymerization and the recovery of the resulting polymer, when desired, is carried out as otherwise described above.

The polymeric flocculents of this invention can also be prepared by reacting the alkylating agent with an initially formed polymer, i.e. either a homopolymer of an alpha-ethylenically unsaturated thio-ether, or a copolymer thereof with an alpha-ethylenically unsaturated comonomer as defined above, the alkylation and initial polymerization, as well as the recovery of the polymer product, also being carried out as otherwise described above.

The interpolymers of this invention are normally solid (i.e. solid at room temperature under atmospheric pressure), water soluble compounds, and are generally obtained having a reduced viscosity of from about 0.1 to about 5 or more when measured at a temperature of 30° C. from a solution containing 0.2 gram of polymer in 100 milliliters of a 0.5 molar aqueous sodium acetate solution. The term "reduced viscosity" is well known in the polymer art and designates a value obtained by dividing the specific viscosity of a solution of the polymer by the concentration of the polymer in solution, the concentration being measured in grams of polymers per 100 milliliters of solvent. The specific viscosity is obtained by dividing the difference between the viscosity of the polymer solution and the viscosity of the solvent by the viscosity of the solvent. The reduced viscosity of a polymer is regarded as a measure of the molecular weight of the polymer, with higher values indicating higher molecular weights.

The interpolymers of this invention find utility in various applications. They can, for instance, be used to produce films suitable for use as packaging and coatings. In particular, it has been found that the interpolymers can be effectively employed as flocculents in the treatment of aqueous anionic suspensions, wherein the dispersion of solid matter is stabilized by a negative charge. This is especially true of the polymers produced by polymerization techniques using the preferred diluents described above. As illustrative of the suspensions which can be flocculated using the interpolymers of this invention, there can be mentioned aqueous dispersions or slurries of silica, carbon, clay, biologically treated industrial wastes, such as textile mill wastes, etc., sewage sludge, "white water" (i.e. the effluent from paper-making machines used in the conventional manufacture of paper products which contains a suspension of paper-making fibers and which may also contain a suspension of fillers and/or pigments such as titanium dioxide and calcium carbonate, etc.), and the like. The interpolymers have, in fact, been found to be especially effective in the treatment of sewage sludge, and can be employed in this connection to treat raw sludge, digested or partially digested sludge, digested sludge elutriant, etc., at any of the various stages of conventional sewage treatment. In this manner, the present invention provides a distinct advantage over the use of many conventional flocculents.

The interpolymers of this invention are employed as flocculents by admixing one or more of them in the suspension for which flocculation is desired in a concentration which can vary broadly in the range of from about 0.01 to about 10 percent by weight of the polymer(s) based upon the weight of the solid dispersed phase. Preferably, polymer concentrations of from about 0.1 to about 2.5 percent by weight are employed. The optimum concentration of polymer may vary, of course, depending upon the suspension being flocculated, upon the molecular weight of the polymer, etc., and can readily be determined by one skilled in the art in light of this disclosure.

The interpolymers can be incorporated in the suspension in solid form and dissolved therein, or, preferably, introduced as an aqueous solution. Stock solutions of the interpolymer are most conveniently prepared and utilized in this connection, preferably containing from about 0.25 to about 5 percent by weight of interpolymer in water. Solutions containing higher interpolymer concentrations can also be prepared, limited, for practical purposes, only by the increasing viscosity of the solution as the molecular weight and/or concentration of the polymer increases. Any other convenient manner of incorporating and admixing the polymer in the suspension can be utilized, as can any flocculating quantity of the interpolymer. The flocculation thus effected is evi- The invention can be illustrated further by the following specific examples of its practice.

EXAMPLE I

A 300 cc. Pyrex bottle was charged with 8 grams of 2-methylthioethyl acrylate, 12 grams of acrylamide, 100 grams of dry acetonitrile and 0.2 gram of azodiisobutyronitrile. The bottle was flushed with nitrogen, capped and placed in a revolving, constant temperature water bath at a temperature of 50° C. for a period of 20 hours. An acrylamide/2-methylthioethyl acrylate copolymer was formed as a suspension in acetonitrile. The copolymer, contained, in polymerized form, and on a theoretical monomer basis, approximately 25 mole percent of the acrylate. A solution of 7 grams of dimethyl sulfate in 100 grams of dry acetonitrile was then added to the suspension in the bottle, whereupon the bottle was returned to the revolving bath for an additional period of 20 hours at a temperature of 50° C. The amount of dimethyl sulfate employed was sufficient to convert essentially all of the polymerized 2-methylthioethyl acrylate units to the corresponding, polymerized form of (2-acryloxyethyl)dimethylsulfonium methylsulfate units, so that an acrylamide/(2-acryloxyethyl)dimethylsulfonium methylsulfate copolymer was formed as a suspension in acetonitrile. The copolymer contained, in polymerized form and on a theoretical monomer basis, approximately 40 mole percent of the sulfonium compound and 60 mole percent of acrylamide. The polymer suspension was then washed with dry acetone and subsequently filtered to recover the polymer. Thereafter, the polymer was dried at a temperature of 40° C. for a period of 16 hours. In this manner, 26 grams of polymer were obtained as a white powder. The polymer had a reduced viscosity of 0.68 in 0.5 molar aqueous sodium acetate.

EXAMPLE II

A. A polymer having approximately the same chemical composition as the polymer product of Example I, above, but varying therefrom by having a lower molecular weight, was obtained in a manner similar to that described in Example I, using one-half the quantity of each reactant. Thus, 4 grams of 2-methylthioethyl arcylate was initially polymerized with 6 grams of acrylamide in 50 grams of dry acetonitrile by contacting the monomer mixture with 0.1 gram of azodiisobutyronitrile at a temperature of 50° C. for a period of 16 hours. The acrylamide/2-methylthioethyl acrylate copolymer suspension thereby formed was washed with isopropyl ether and filtered to recover the polymer, which was then dried at a temperature of 50° C. for a period of 16 hours. The copolymer, containing, in polymerized form and on a theoretical monomer basis, approximately 26 mole percent of the acrylate, was thereafter brought into reactive admixture with 3.5 grams of dimethyl sulfate in 100 grams of dry acetonitrile at a temperature of 50° C. for a period of 20 hours. The amount of dimethyl sulfate employed was sufficient to convert essentially all of the polymerized 2-methylthioethyl acrylate units to the corresponding, polymerized form of (2-acryloxyethyl)dimethylsulfonium methylsulfate units, so that an acrylamide/(2-acryloxyethyl)dimethylsulfonium methylsulfate copolymer was formed as a suspension in acetonitrile. The resulting copolymer contained, in polymerized form and on a theoretical monomer basis, approximately 40 mole percent of the sulfonium compound and 60 mole percent of acrylamide. The polymer suspension was then washed with isopropyl ether and subsequently filtered to recover the polymer. Thereafter, the polymer was dried at a temperature of 50° C. for a period of 16 hours. In this manner, 12 grams of polymer were obtained as a white powder. The polymer had a reduced viscosity of 0.57 in 0.5 molar aqueous sodium acetate.

B. In similar manner to that described above in this example, 4 grams of 2-methylthioethyl acrylate were initially polymerized with 6 grams of acrylamide in 50 grams of dry acetonitrile by contacting the monomer mixture with 0.2 gram of azodiisobutyronitrile at a temperature of 50° C. for a period of 20 hours. To the acrylamide/2-methylthioethyl acrylate copolymer suspension thereby formed, 3.5 grams of dimethylsulfate were subsequently introduced and brought into reactive admixture therewith at a temperature of 50° C. for a period of 20 hours. The amount of dimethyl sulfate employed was sufficient to convert essentially all of the polymerized 2-methylthioethyl acrylate units to the corresponding, polymerized form of (2-acryloxyethyl)dimethylsulfonium methylsulfate units, so that an acrylamide/(2-acryloxyethyl)dimethylsulfonium methylsulfate copolymer was formed in a slurry in acetonitrile. The resulting copolymer contained, in polymerized form and on a theoretical monomer basis, approximately 40 mole percent of the sulfonium compound and 60 mole percent of acrylamide. The polymer slurry was then diluted with acetone and subsequently filtered to recover the polymer. Thereafter, the polymer was dried at a temperature of 50° C. for a period of 16 hours. In this manner, 12.5 grams of polymer were obtained as a white powder. The polymer had a reduced viscosity of 0.25 in 0.5 molar aqueous sodium acetate.

EXAMPLE III

A 300 cc. Pyrex bottle was charged with 25 grams of acrylamide, 25 grams of (2-acryloxyethyl)dimethylsulfonium methylsulfate, 120 grams of dry acetonitrile and 0.5 gram of azodiisobutyronitrile. The bottle was flushed with nitrogen, capped and placed in a revolving, constant temperature water bath at a temperature of 50° C. for a period of 18 hours. An acrylamide/(2-acryloxyethyl)dimethylsulfonium methylsulfate copolymer was formed as a suspension in acetonitrile. The copolymer contained, in polymerized form and on a theoretical monomer basis, approximately 80 mole percent of acrylamide and 20 mole percent of 2 - (acryloxyethyl)dimethylsulfonium methylsulfate. The polymer suspension was then washed with isopropyl ether and subsequently filtered to recover the polymer. Thereafter, the polymer was dried at a temperature of 50° C. for a period of 20 hours. In this manner, 50 grams of polymer were obtained as a white powder. The polymer had a reduced viscosity of 1.7 and was found by analysis to contain about 12 percent by weight of sulfur. The experiment was repeated in identical manner, and a similar copolymer was obtained as a product. The polymer differed only in molecular weight, having a reduced viscosity of 1.0 in 0.5 molar aqueous sodium acetate. The two polymers were then blended together to form the product employed as a flocculent as indicated below.

EXAMPLE IV

A 500 cc., 4-neck, flat Pyrex flask, fitted with a glass stirrer, thermometer and condenser, was charged with 15 grams of acrylamide, 10 grams of 2-methylthioethyl acrylate, 9 grams of dimethylsulfate, 200 grams of dry acetonitrile and 0.25 gram of tributylboron. The reactants were stirred under a positive nitrogen pressure, with the flask immersed in a constant temperature water bath at a temperature of 25° C., for a period of 30 minutes. An additional drop of tributylboron was added to the contents of the flask, after which the flask was allowed to remain in the bath, accompanied by continued stirring, for a further period of 1.5 hours. A polymer was formed as a slurry of increasing thickness, whereupon an additional 100 grams of dry acetonitrile were introduced into the flask. The slurry was then heated to a temperature of 50° C., with stirring, over a period of 2 hours, allowed to stand overnight, and finally reheated to a temperature of 50° C., with stirring, over a period of 6 hours. The slurry was then washed with acetone and filtered to recover the polymer. Thereafter, the polymer was dried at a temperature of 50° C. for a period of 16 hours. In this manner, about 34 grams of an acrylamide/(2-acryloxyethyl)dimethylsulfonium methylsulfate copolymer were obtained as a white powder. The polymer contained, in polymerized form and on a theoretical monomer basis, approximately 25 mole percent of the sulfonium compound and 75 mole percent of acrylamide.

EXAMPLE V

A 300 cc. Pyrex bottle was charged with 3 grams of acrylamide, 3 grams of (2-acryloxyethyl)carboxymethylmethylsulfonium chloride, 12 grams of dry acetonitrile and 0.06 gram of azodiisobutyronitrile. The bottle was flushed with nitrogen, capped and placed in a revolving, constant temperature water bath at a temperature of 50° C. for a period of 16 hours. An acrylamide/(2-acryloxyethyl)carboxymethylmethylsulfonium chloride copolymer was formed as a suspension in acetonitrile. The copolymer contained, in polymerized form and on a theoretical monomer basis, approximately 85 mole percent of acrylamide and 15 mole percent of the sulfonium compound. The polymer suspension was then washed with acetone and subsequently filtered to recover the polymer. Thereafter, the polymer was dried at a temperature of 50° C. for a period of 16 hours. In this manner, 4.17 grams of polymer were obtained as a white powder. The polymer had a reduced viscosity of 2.08 in 0.5 molar aqueous sodium acetate, and was found by analysis to contain about 5.3 percent by weight of chlorine.

EXAMPLE VI

A 300 cc. Pyrex bottle was charged with 6 grams of acrylamide, 2 grams of 2,3-bis(methylthio)propyl methacrylate, 2.3 grams of dimethyl sulfate, 0.08 gram of azodiisobutyronitrile and 40 grams of dry acetonitrile. The bottle was flushed with nitrogen, capped and placed in a revolving, constant temperature water bath at a temperature of 50° C. for a period of 62 hours. An acrylamide/3 - acryloxypropyl - 1,2 - bis(dimethylsulfonium) di(methylsulfate) copolymer was formed as a suspension in acetonitrile. The copolymer contained, in polymerized form and on a theoretical monomer basis, approximately 92 percent of acrylamide and 8 mole percent of the sulfonium compound. The polymer suspension was then washed with isopropanol and subsequently filtered to recover the polymer. Thereafter, the polymer was dried at a temperature of 50° C. for a period of 16 hours. In this manner, 9.5 grams of polymer were obtained as a white granular powder.

EXAMPLE VII

A 300 cc. Pyrex bottle was charged with 3 grams of acrylamide, 2 grams of (2-acryloxyethyl)carboxymethylmethylsulfonium chloride, 10 grams of dry acetone and 0.05 gram of azodiisobutyronitrile. The bottle was flushed with nitrogen, capped and placed in a revolving, constant temperature water bath at a temperature of 50° C. for a period of 19 hours. An acrylamide/(2-acryloxyethyl)carboxymethylmethylsulfonium chloride copolymer was formed as a suspension in acetone. The copolymer contained, in polymerized form and on a theoretical monomer basis, approximately 85 mole percent of acrylamide and 15 mole percent of the sulfonium compound. The polymer suspension was then washed with heptane, and filtered to recover the polymer. Thereafter, the polymer was dried at a temperature of 40° C. for a period of 20 hours. In this manner, 4.8 grams of polymer were obtained as a white powder. The polymer had a reduced viscosity of 1.96 in 0.5 molar aqueous sodium acetate.

EXAMPLE VIII

In this example, various polymers of this invention were evaluated as flocculating agents in connection with the flocculation of pigment-containing "white water" suspensions. The evaluation was conducted as follows. A synthetic "white water" was prepared by cutting bleached sulfite pulp into ¼-inch square. The cut pulp was soaked in water and beaten for a period of 1 hour in a Valley laboratory beater to a consistency of 1.7 percent. A 1-quart aliquot of the beaten pulp, containing 15 grams of pulp fiber in suspension in water, was removed and diluted to 15 gallons with additional water, whereupon 1.5 grams of pigment were also added to the suspension, giving a total solids content of 0.029 percent by weight. One-liter aliquots, containing 0.3 gram of solids, were removed from the suspension, and were treated with varying amounts of the polymer being evaluated by admixing each aliquot of the suspension with an aqueous solution of the polymer for a short period. The effectiveness of the polymer as a flocculent was determined by measuring the rate of filtration of water from the polymer-treated suspension in the following manner. An inverted Buchner funnel containing No. 1 whatman filter paper was connected to an evacuated flask, serving as a source of constant vacuum, and immersed for one minute in the treated polymer suspension. The filtrate was collected in a filter flask and measured.

The results obtained are tabulated below in Tables A, B and C. In Table A, the data tabulated was obtained from experiments conducted using kaolinite clay as the sole pigment component of the synthetic "white water"; in Table B, the data tabulated was obtained from experiments conducted using titanium dioxide as the sole pigment component of the synthetic "white water"; and in Table C, the data tabulated was obtained from experiments conducted using titanium dioxide as the sole pigment component of the synthetic "white water." The polymers evaluated were the polymers produced as described above in Examples IIA, III and VII. For comparison, experiments were also conducted employing in one instance, as the polymer, a commercially available polyacryamide flocculent, and in another instance, substituting for the polymer, another commercially available flocculent, viz., alum, $Al_2(SO_4)_3 \cdot 18H_2O$. In addition, a control experiment was conducted in which no flocculent was employed.

In the tables, the concentration of flocculent is indicated in percent by weight of polymer based upon the weight of pulp in the suspension. The pH is that of the treated suspension. The filtration rate is tabulated in cubic centimeters per minute, i.e., the volume of filtrate collected under standard conditions in one minute. For convenience and clarity the filtration rate has also been converted to a filtration rate ratio according to the formula:

$$\frac{\text{Filtration rate of flocculent-treated ``white water''}}{\text{Filtration rate of untreated ``white water''}} = \text{Filtration rate ratio}$$

wherein the denominator represents the filtration rate obtained in the control experiment in which no flocculent was employed. A ratio greater than 1 indicates that flocculation has been engendered, increasing in effectiveness as the ratio increases.

Table A

| Flocculent Employed | Concentration of Flocculent | pH | Filtration Rate | Filtration Ratio |
|---|---|---|---|---|
| None | | 6.7 | 165 | 1.0 |
| Alum | 231 | 4.5 | 240 | 1.5 |
| Polyacrylamide | 0.033 | 4.5 | 255 | 1.5 |
| Do | 0.33 | 4.5 | 340 | 2.1 |
| Do | 3.3 | 4.5 | 55 | 0.33 |
| Polymer of Ex. VII | 0.033 | 6.7 | 400 | 2.4 |
| Do | 0.33 | 6.7 | 520 | 3.1 |
| Do | 3.3 | 6.7 | 410 | 2.5 |
| Do | 33 | 6.7 | 65 | 0.39 |

Table B

| Flocculent Employed | Concentration of Flocculent | pH | Filtration Rate | Filtration Ratio |
|---|---|---|---|---|
| None | | 7.5 | 170 | 1.0 |
| Alum | 231 | 4.5 | 285 | 1.7 |
| Polyacrylamide | 0.033 | 4.5 | 215 | 1.3 |
| Do | 0.33 | 4.5 | 312 | 1.9 |
| Do | 3.3 | 4.5 | 60 | 0.35 |
| Polymer of Ex. VII | 0.033 | 6.7 | 200 | 1.2 |
| Do | 0.33 | 6.7 | 460 | 2.7 |
| Do | 3.3 | 6.7 | 540 | 3.2 |
| Do | 33 | 6.7 | 135 | 0.8 |

Table C

| Flocculent Employed | Concentration of Flocculent | pH | Filtration Rate | Filtration Ratio |
|---|---|---|---|---|
| None | | 8.4 | 160 | 1.0 |
| Polyacrylamide | 0.33 | 8.4 | 110 | 0.69 |
| Polymer of Ex. VII | 0.033 | 8.4 | 380 | 2.4 |
| Do | 0.33 | 8.4 | 270 | 1.7 |
| Do | 3.3 | 8.4 | 375 | 2.3 |
| Do | 33 | 8.4 | 60 | 0.37 |

The superior effectiveness of the polymers of this invention as a flocculent is readily apparent from the above tables. It can also be seen that the optimum amount of the flocculent, insofar as effectiveness as a flocculent is concerned, will vary depending upon the particular polymer employed as well as upon the suspension being treated, and that an excessive amount of flocculent may have an adverse, deflocculating effect. Thus, as indicated previously, the optimum amount of flocculent can readily be determined by one skilled in the art in light of this disclosure. In addition, it can be seen that, unlike certain conventional flocculents, the polymers of this invention are effective as flocculents in both acidic and basic environments.

EXAMPLE IX

In this example, the polymer of this invention produced as described above in Example I, was evaluated as a flocculating agent in connection with the flocculation of a digested sewage sludge suspension containing 6 percent total solids, obtained from a commercial sewage treatment plant. The evaluation was conducted as follows. A 0.5 percent solution of the polymer was prepared by sifting 5 grams of the polymer into 995 grams of water, following by admixture with a Lightnin mixer at a speed of about 1750 r.p.m. for a period of one hour. The polymer appeared readily soluble under these low shear conditions. To appraise the shear stability of the polymer under high shear conditions and to insure dissolution, 500 grams (one-half) of the polymer solution was mixed further in a Waring Blendor at a speed of about 15,000 r.p.m. for a period of 4 minutes. The digested sewage sludge suspension was then treated with varying amounts of polymer which, in one instance had been subjected to only low shear mixing, and in another instance, to both low and high shear mixing, by adding 150 milliliter aliquots of aqueous polymer solution to 300 grams aliquots of the sewage sludge suspension in a 500 milliliter graduated cylinder. The contents of the cylinder were initially mixed by inverting the cylinder 30 times, whereupon the contents were transferred to a 600 milliliter beaker and stirred therein for a period of 5 minutes using a paddle-blade stirrer rotating at a speed of about 100 r.p.m. The effectiveness of the polymer as a flocculent was determined by measuring the rate of filtration of water from the polymer-treated suspension in the following manner. An inverted Buchner funnel, sawed off flush to the perforated disc, was fitted with #40 whatman filter paper and connected to an evacuated flask, serving as a source of constant vacuum (30 to 40 millimeters of mercury). The funnel was then immersed for 30 seconds in the treated suspension in an inverted position and thereafter allowed to drain in an upright position for another 30 seconds, thus simulating a commercial vacuum drum filtration operation. The filtrate was collected in a filter flask and measured.

The results obtained are tabulated below in Table D. In the table, the designation (a) indicates the polymer was subjected to only low shear mixing during dissolution as described above in this example; the designation (b) indicates the polymer was subjected to both low shear mixing and then to high shear mixing and also described above in this example. The concentration of flocculent is indicated in percent by weight of polymer based upon the weight of sewage sludge solids. The filtration rate is tabulated in cubic centimeters per minute, i.e., the volume of filtrate collected under standard conditions in one minute by the procedure indicated above. For comparison, an experiment was conducted, substituting for the polymer a commercially available ferric chloride flocculent. A control experiment was also conducted in which no flocculent was employed.

Table D

| Flocculent Employed | Concentration of Flocculent | Filtration Rate |
|---|---|---|
| None | 0 | 8 |
| Polymer of Ex. I(a) | 0.3 | 73 |
| Do | 0.5 | 112 |
| Do | 0.8 | 160 |
| Do | 1.0 | 250 |
| Do | 1.25 | 256 |
| Do | 1.5 | 206 |
| Polymer of Ex. I(b) | 0.2 | 80 |
| Do | 0.3 | 100 |
| Do | 0.4 | 138 |
| Do | 0.5 | 176 |
| Do | 0.6 | 228 |
| Do | 0.7 | 232 |
| Do | 0.8 | 254 |
| Do | 1.0 | 218 |
| Do | 1.25 | 188 |
| Ferric Chloride | 2.0 | 43 |
| Do | 3.0 | 58 |
| Do | 4.0 | 78 |
| Do | 5.0 | 92 |
| Do | 6.0 | 98 |
| Do | 8.0 | 104 |

The improved flocculating effectiveness of the polymer of this invention is again apparent from the above table. In similar manner, the polymer product of Example VI is also employed effectively as a flocculent.

EXAMPLE X

In this example, various polymers of this invention were evaluated as flocculating agents in connection with the flocculation of a digested sewage sludge suspension. The evaluation was conducted as follows. A stock solution of each polymer tested was prepared by adding 2 grams of the polymer to 200 grams of water, followed by low shear admixture with a Lightnin mixer at a speed of about 900 r.p.m. for a period of 2 hours. To insure dissolution of the polymer, the solution was mixed further under high shear conditions in a Waring Blendor at a speed of about 15,000 r.p.m. for a period of 3 minutes. Aliquots of the polymer solution were then diluted with additional water to a total volume of 60 milliliters and added to 200 gram aliquots of a digested sewage sludge suspension containing 5 percent total solids by weight, obtained from a commercial sewage treatment plant. After being stirred gently for a period of 1 minute, the polymer-treated sewage sludge was poured into a vacuum filtration apparatus consisting of a 9 centimeter diameter Buchner funnel equipped with No. 4 whatman filter paper and adapted to a 250 milliliter graduated cylinder, which was in turn connected to a water aspirator, serving as a vacuum source. The volume of filtrate obtained from the polymer-treated sewage sludge and collected in the graduated cylinder was recorded at frequent intervals until the dewatering of the sewage sludge ceased. This procedure was repeated using various proportions of flocculent to sewage sludge until a maximum filtration rate was attained. The concentration of flocculent was calculated as a percentage ratio of the weight of polymer to the weight of the sludge's solid fraction on a dry basis. In addition, for control purposes, an experiment was conducted in which no flocculent was employed.

The data obtained were interpreted according to the relationships developed by Dr. P. Coackley as described in Biological Treatment of Sewage and Industrial Wastes, J. McCabe, ed., vol. 2, Reinhold Publishing Corp., New York, 1958, pp. 270–91. The relationships derived express the filterability of the flocculated sludge in terms of the "specific resistance" of the sludge. Relative specific resistances can be determined from data collected by the Buchner funnel technique as hereinabove described. When the filtration pressure, filtrate viscosity, solids content of the sludge, and filter area are all held constant, the specific resistances of various sludges are proportional to their "filtration gradients." The filtration gradient is expressed as the slope of the plot of $t/V$ vs. $V$, where "$t$" is time in seconds and "$V$" is filtrate volume in milliliters. The filterability is inversely proportional to the specific resistance; hence, it is also inversely proportional to the filtration gradient.

This technique provides a convenient means of comparing the effectiveness of various flocculents. Since a major commercial application of flocculents will involve their use in conjunction with rotary vacuum filters, the various flocculents are compared on the basis of the anticipated increase in filter yield (lb. dry flocculated solids/sq. ft. of filter area/hr.) accomplished by flocculation of the sludge. The filter yield has been reported to be inversely proportional to the square root of the specific resistance of the filter cake. Since specific resistance is proportional to filtration gradient under the conditions of this procedure, filter yield is also inversely proportional to the square root of the filtration gradient.

The data obtained, and the relationships derived therefrom, are tabulated below in Table E. In the table the optimum concentration indicates the lowest concentration of flocculent at which a maximum rate of filtration was attained, and is indicated in percent by weight of polymer based upon the weight of sewage sludge solids; the filtration gradient, designated in second/centimeter [6], indicates the slope of the plot of $t/V$ vs. $V$, wherein $t$ and $V$ are as defined above. For convenience and comparison, the filtration gradient has also been converted to a filtration improvement factor according to the formula:

$$\frac{\text{Filtration gradient of flocculent-treated sludge}}{\text{Filtration gradient of flocculent-untreated sludge}} = \text{filtration improvement factor}$$

wherein the denominator represents the filtration gradient obtained in the control experiment in which no flocculent was employed. The filter yield improvement factor is the square root of the filtration improvement factor.

Table E

| Flocculent | Optimum Concentration | Filtration Gradient | Filtration Improvement Factor | Filter Yield Improvement Factor |
|---|---|---|---|---|
| Polymer of Example IIA | 2.4 | 0.00044 | 1,140 | 34 |
| Polymer of Example III | 2.4 | 0.023 | 22 | 5 |
| None | | 0.50 | | |

EXAMPLE XI

A series of experiments were conducted in a manner similar to that described above in Example X, with the following exception, viz., that only a portion of the stock solution of each polymer tested was subjected to high shear mixing in a Waring Blendor as indicated above. The data obtained, and the relationships derived therefrom, are tabulated below in Tables F and G as described above in connection with Table E. The data tabulated in Table F were obtained from experiments employing a digested sewage sludge suspension containing 3 percent total solids by weight; the data tabulated in Table G were obtained from experiments employing a digested sewage sludge suspension containing about 6 percent total solids by weight; both sludge samples being obtained from a commercial sewage treatment plant. In the tables, the data tabulated in column A were obtained from experiments in which the polymer solution was subjected to only low shear mixing during its preparation. The data tabulated in column B were obtained from experiments in which the polymer solution was also subjected to high shear mixing during its preparation.

Table F

| Flocculent | A | | B | |
|---|---|---|---|---|
| | Optimum Concentration | Filtration Gradient | Optimum Concentration | Filtration Gradient |
| Polymer of Example V | [1] 3.3 | 0.00045 | 3.3 | 0.00159 |
| Polymer of Example VII | [1] 2.5 | 0.00047 | 2.5 | 0.00138 |
| None | | 0.31 | | |

[1] Higher concentrations were not tested.

Table G

| Flocculent | A | | B | |
|---|---|---|---|---|
| | Optimum Concentration | Filtration Gradient | Optimum Concentration | Filtration Gradient |
| Polymer of Example IIB | 1.1 | 0.00011 | 0.7 | 0.00040 |
| Polymer of Example I | 1.4 | 0.00021 | 0.9 | 0.00037 |
| Polymer of Example IV | 1.8 | 0.00016 | 1.4 | 0.00039 |
| None | | 0.25 | | |

The polymer of this example is also effective as a flocculating agent in connection with the flocculation of aqueous suspensions containing clay, carbon black and silica.

EXAMPLE XII

A glass polymerization bottle was charged with 10.75 grams of 2-methylthioethyl acrylate, 80 grams of styrene, 1 gram of azo-2,2'-diisobutyronitrile, and 25 grams of acetonitrile. The bottle was purged with nitrogen, capped, and tumbled in a constant temperature rotary water bath at a temperature of 50° C. for a period of 20 hours. In this manner, a copolymer of 2-methylthioethyl acrylate and styrene was obtained in acetonitrile solution. To this solution 9 grams of dimethyl sulfate were then added, the amount of dimethyl sulfate employed being sufficient to convert essentially all of the polymerized 2-methylthioethyl acrylate units to the corresponding polymerized form of (2-acryloxyethyl)dimethylsulfonium methylsulfate and 90 mole percent of polymerized styrene on a theoretical monomer in basis was obtained in acetonitrile solution. The polymer was subsequently coagulated, filtered, and dried. In similar manner, styrene is copolymerized, independently, with (2-acryloxyethyl)carboxymethylmethylsulfonium chloride, (2-methacryloxyethyl)methylethylsulfonium methylsulfate, and 3-methacryloxypropyl-1,2-bis(dimethylsulfonium) di(methylsulfate).

Upon the addition of aqueous solutions of the aforementioned polymers to an aqueous digested sewage sludge suspension and to an aqueous "white-water" suspension of cellulosic paper-making pulp fibers, in a concentration of from about 1 to 2 percent by weight of polymer based upon the total solids present, the effectiveness of the polymers as flocculents is evidenced as measured and determined by the improved rate of filtration of water from the polymer-treated suspensions.

EXAMPLE XIII

A glass polymerization bottle was charged with 10 grams of 2-methylthioethyl acrylate, 10 grams of N-methyl-N-vinylacetamide, 0.2 gram of azo-2,2'-diisobutyronitrile, and 50 grams of acetonitrile. The bottle was purged with nitrogen, capped, and tumbled in a constant temperature rotary water bath at a temperature of 50° C. for a period of 20 hours. In this manner, a copolymer of 2-methylthioethyl acrylate and N-methyl-N-vinylacetamide was obtained in acetonitrile solution. To this solution, 8.8 grams of dimethyl sulfate were then added, the amount of dimethyl sulfate employed being sufficient to convert essentially all of the polymerized 2-methylthioethyl acrylate units to the corresponding polymerized form of (2-acryloxyethyl)dimethylsulfonium methylsulfate, so that a polymer comprised of approximately 45 mole percent of polymerized (2-acryloxyethyl)-dimethylsulfonium methylsulfate and 55 mole percent of polymerized N-methyl-N-vinylacetamide on a theoretical monomer basis was obtained in acetonitrile solution. The polymer was subsequently coagulated, filtered, and dried, to yield upon recovery 26.8 grams of a product having a reduced viscosity of 1.8 in 0.5 molar aqueous sodium acetate. In similar manner, 10 grams of 2-methylthioethyl acrylate are polymerized with 10 grams of N-vinyl-2-pyrrolidone and the resulting copolymer reacted with 8.8 grams of dimethyl sulfate to yield, upon recovery, 28.8 grams of a polymer comprised of approximately 45 mole percent of polymerized (2-acryloxyethyl)dimethylsulfonium methylsulfate and 55 mole percent of polymerized N-vinyl-2-pyrrolidone on a theoretical monomer basis, and having a reduced viscosity of 1.7 in 0.5 molar aqueous sodium acetate. In like manner, N-ethyl-N-vinylpropionamide and N-vinyl-2-pyrrolidone are copolymerized, independently, with (2-acryloxyethyl)carboxymethylmethylsulfonium chloride, (2-methacryloxyethyl)methylethylsulfonium methylsulfate, and 3-methacryloxypropyl-1,2-bis(dimethylsulfonium) di(methylsulfate).

Upon the addition of aqueous solutions of the aforementioned polymers to an aqueous digested sewage sludge suspension and to an aqueous "white-water" suspension of cellulosic paper-making pulp fibers, in a concentration of from about 1 to 2 percent by weight of polymer based upon the total solids present, the effectiveness of the polymers as flocculents is evidenced as measured and determined by the improved rate of filtration of water from the polymer-treated suspensions.

What is claimed is:

1. The solid interpolymer consisting essentially of (A) a polymerized alpha-ethylenically unsaturated sulfine of the formula:

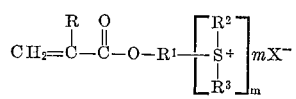

wherein R is selected from the group consisting of hydrogen and methyl, $R^1$ is a saturated aliphatic hydrocarbon radical of from 1 to 4 carbon atoms, $R^2$ is alkyl of from 1 to 4 carbon atoms, $R^3$ is selected from the group consisting of methyl and carboxymethyl, X is selected from the group consisting of methylsulfate, bromine, iodine, and chlorine, such that X is chlorine when $R^3$ is carboxymethyl, and $m$ is an integer of from 1 to 2; and (B) a polymerized alpha-ethylenically unsaturated comonomer selected from the group consisting of acrylamide, styrene, N-vinylpyrrolidone, and the N-alkyl-N-vinylamides of the formula:

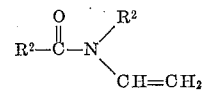

wherein each $R^2$, independently, is alkyl of from 1 to 4 carbon atoms; said interpolymer containing, in polymerized form and on a theoretical monomer basis, from about 20 to about 95 mole percent of said comonomer and from about 5 to about 80 mole percent of said sulfine when said comonomer is selected from the group consisting of acrylamide and styrene, and from about 20 to about 75 mole percent of said comonomer and from about 25 to about 80 mole percent of said sulfine when said comonomer is selected from the group consisting of N-vinylpyrrolidone and N-alkyl-N-vinylamides.

2. The solid copolymer of acrylamide and an alpha-ethylenically unsaturated sulfine of the formula:

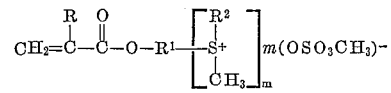

wherein R is selected from the group consisting of hydrogen and methyl, $R^1$ is a saturated aliphatic hydrocarbon radical of from 1 to 4 carbon atoms, $R^2$ is alkyl of from 1 to 4 carbon atoms, and $m$ is an integer of from 1 to 2; said copolymer containing, in polymerized form and on a theoretical monomer basis, from about 20 to about 95 mole percent of acrylamide and from about 5 to about 80 mole percent of said sulfine.

3. The solid copolymer of acrylamide and an alpha-ethylenically unsaturated sulfine of the formula:

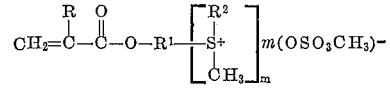

wherein R is selected from the group consisting of hydrogen and methyl, $R^1$ is a saturated aliphatic hydrocarbon radical of from 1 to 4 carbon atoms, $R^2$ is alkyl of from 1 to 4 carbon atoms, and $m$ is an integer of from 1 to 2; said copolymer containing, in polymerized form and on a theoretical monomer basis, from about 40 to about 90 mole percent of acrylamide and from about 10 to about 60 mole percent of said sulfine.

4. The solid copolymer according to claim 3 wherein the ethylenically unsaturated sulfine is 2-(acryloxyethyl) dimethylsulfonium methylsulfate.

5. The solid copolymer according to claim 3 wherein the ethylenically unsaturated sulfine is 3-acryloxypropyl-1,2-bis(dimethylsulfonium) di(methylsulfate).

6. The solid copolymer of styrene and alpha-ethylenically unsaturated sulfine of the formula:

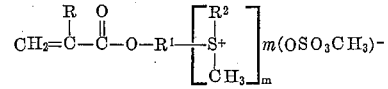

wherein R is selected from the group consisting of hydrogen and methyl, $R^1$ is a saturated aliphatic hydrocarbon radical of from 1 to 4 carbon atoms, $R^2$ is alkyl of from 1 to 4 carbon atoms, and $m$ is an integer of from 1 to 2; said copolymer containing, in polymerized form and on a theoretical monomer basis, from about 20 to about 95 mole percent of styrene and from about 5 to about 80 mole percent of said sulfine.

7. The solid copolymer of styrene and (2-acryloxyethyl)dimethylsulfonium methylsulfate; said copolymer containing, in polymerized form and on a theoretical monomer basis, from about 40 to about 90 mole percent of styrene and from about 10 to about 60 mole percent of (2-acryloxyethyl)dimethylsulfonium methylsulfate.

8. The solid copolymer of (A) an N-alkyl-N-vinyl-amide of the formula:

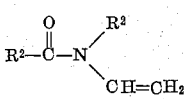

wherein each $R^2$, independently, is alkyl of from 1 to 4 carbon atoms, and (B) an alpha-ethylenically unsaturated sulfine of the formula:

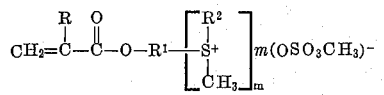

wherein R is selected from the group consisting of hydrogen and methyl, $R^1$ is a saturated aliphatic hydrocarbon radical of from 1 to 4 carbon atoms, $R^2$ is alkyl of from 1 to 4 carbon atoms, and $m$ is an integer of from 1 to 2; said copolymer containing, in polymerized form and on a theoretical monomer basis, from about 20 to about 75 mole percent of said amide and from about 25 to about 80 mole percent of said sulfine.

9. The solid copolymer of N-methyl-N-vinylacetamide and (2-acryloxyethyl)dimethylsulfonium methylsulfate; said copolymer containing, in polymerized form and on a theoretical momomer basis, from about 40 to about 60 mole percent of N-methyl-N-vinylacetamide and from about 40 to about 60 mole percent of (2-acryloxyethyl-dimethylsulfonium methylsulfate.

10. The solid copolymer of an N-vinylpyrrolidone and an alpha-ethylenically unsaturated sulfine of the formula:

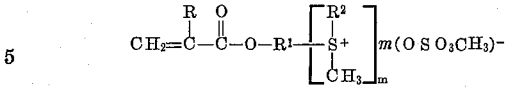

wherein R is selected from the group consisting of hydrogen and methyl, $R^1$ is a saturated aliphatic hydrocarbon radical of from 1 to 4 carbon atoms; $R^2$ is alkyl of from 1 to 4 carbon atoms, and $m$ is an integer of from 1 to 2; said copolymer containing, in polymerized form and on a theoretical monomer basis, from about 20 to about 75 mole percent of said pyrrolidone and from about 25 to about 80 mole percent of said sulfine.

11. The solid copolymer of N-vinyl-2-pyrrolidone and (2-acryloxyethyl)dimethylsulfonium methylsulfate, said copolymer containing, in polymerized form and on a theoretical monomer basis, from about 40 to about 60 mole percent of N-vinyl-2-pyrrolidone and from about 40 to about 60 mole percent of (2-acryloxyethyl)dimethylsulfonium methylsulfate.

References Cited by the Examiner
UNITED STATES PATENTS
3,130,117   4/1964   Humiston et al. _____ 260—79.7

JOSEPH L. SCHOFER, *Primary Examiner.*

D. K. DENENBERG, *Assistant Examiner.*